June 12, 1934.    C. A. CAMPBELL    1,962,268

AIR BRAKE

Original Filed June 29, 1932

Inventor
Charles A. Campbell
By
Attorneys

Patented June 12, 1934

1,962,268

UNITED STATES PATENT OFFICE 1,962,268

AIR BRAKE

Charles A. Campbell, Watertown, N. Y., assignor to The New York Air Brake Company, a corporation of New Jersey Application June 29, 1932, Serial No. 620,015
Renewed February 27, 1933

19 Claims. (Cl. 303—47)

This invention relates to air brakes and particularly to the functions of the engineer's brake valve. The principal object of the invention is to neutralize or reduce the harmful effects in service applications of the pressure gradient which exists in long and leaky brake pipes under running conditions. This result is secured without adversely affecting operation in service applications when brake pipe leakage is small, as it may be on long trains, and as it usually is on short trains.

A certain amount of brake pipe leakage is inevitable under ordinary maintenance conditions, and leakage obviously increases with the length of the train. With the engineer's brake valve in running position the feed valve functions to deliver air to the brake pipe to maintain brake pipe pressure and make up for leakage. With extremely long trains the brake pipe pressure adjacent the feed valve is higher and may, under unfavorable conditions, be as much as 18 pounds per square inch higher than brake pipe pressure at the rear of the train.

When the engineer moves his brake valve to service and then to lap position, he establishes a desired reduced pressure in the equalizing reservoir to control the functioning of the equalizing discharge valve, and interrupts all feed to the brake pipe. When a heavy pressure gradient exists, cessation of such feed, flow to the rear in the brake pipe, and continued brake pipe leakage, combine to produce a much heavier reduction of brake pipe pressure at the front end of the train than at the rear end. This occurs independently of the opening of the equalizing discharge valve and actually reduces or even temporarily delays the opening of that valve.

The intensity of application produced by each triple valve is affected by the amount that brake pipe pressure at the triple valve is reduced, so that the effect of brake pipe pressure gradient is to cause the brakes on the forward cars to apply more heavily than those on the cars at the rear end. If the brakes at the front of the train apply sooner, as well as more intensely, violent slack action results.

The present invention supplies means responsive to the existence of brake pipe pressure gradient, and serving to delay, in variable degree, the discharge of air through the equalizing discharge valve, to the end that when such gradient exists, discharge through the equalizing discharge valve will be throttled and thus distributed over a longer time period, than when there is little or no gradient.

A preferred embodiment of the invention is illustrated in the accompanying drawing, in which,—

Fig. 1 is a view in vertical axial section through an engineer's brake valve in running position with connected equalizing discharge control mechanism also in running condition, i. e., with the timing valve closed and the discharge controlling valve in throttling position.

Fig. 2 is a fragmentary view showing the timing valve in its open position.

Fig. 3 is a fragmentary view showing the discharge controlling valve in free flow position.

The engineer's brake valve is of the known equalizing discharge type, having the usual positions, for example, release, running, holding, lap, service and emergency, in which it performs functions too well known to require detailed description. The only material change in the brake valve is the addition of ports on the seat and rotary valve, which register in running position and then serve to charge the delay or timing reservoir (added by the present invention) to brake pipe pressure. Charging flow is from the brake pipe port of the engineer's brake valve. In all other positions this reservoir is isolated from the engineer's brake valve.

In the drawing 6 represents the pipe bracket portion or base of the engineer's brake valve, to which all pipe connections are ordinarily made. At 7 is shown the main reservoir connection, at 8 the feed valve connection and at 9 the brake pipe connection. This last leads to the brake pipe 11 through a double-heading cock 12. The threaded nipple 13 depending through the center of portion 6, ordinarily receives the flow controlling discharge fitting of the equalizing discharge valve. This fitting is omitted, and a pipe 14, of much larger capacity is connected to receive the discharge. At 15 is shown the application cylinder pipe and at 16 the distributing valve release pipe. The pipe 17 leads to the equalizing reservoir 18. The pipe 19 leads to the delay or timing reservoir hereinafter described.

Mounted on the pipe bracket portion 6 is the equalizing discharge portion 21 having the familiar equalizing discharge piston 22 and cylinder 23. The piston stem carries the equalizing discharge valve 24, which coacts with the seat bushing 25. It will be observed that nipple 13 is formed on portion 21 and projects through a central aperture in portion 6.

Mounted on the portion 21 is the rotary valve seat portion 26 on which turns the rotary valve 27. The rotary valve is enclosed in cap 28. A key 29 and valve handle 31 serve to turn the rotary valve to the various positions above enumerated. The interior of the cap 28 is subject to main reservoir pressure, as usual, and the rotary valve and its seat have the usual ports and thereby perform the usual functions. This porting is diagrammatically indicated in the drawing.

The only novel ports are the port 32 leading from cavity 33 in the rotary valve and the seat port 34 leading to pipe 19. In running position cavity 33 connects the feed valve port 35 with the brake pipe port 36 and ports 37 and 38 leading to the space above equalizing piston 22 and thence to pipe 17 and equalizing reservoir 18. The branch port 32 and coacting port 34 place pipe 19 in communication with the brake pipe under the conditions just stated.

A shell 41 supported by bracket lugs 42 is subdivided into a delay reservoir 43 and a quick service chamber 44. The charging pipe 19 leads to delay reservoir 43 and the pipe 14 leads from the equalizing discharge valve to the chamber 44. At one end of the shell 41 is a ported mounting face which receives a similarly ported gasket 45. To this face extends a passage 46 from reservoir 43, a passage 47 from chamber 44, and a passage 48 to which a branch pipe 49, leading from brake pipe 11 is connected.

All three of the passages 46, 47 and 48 have continuations in a body 51 bolted against gasket 45 and in a body 52 bolted to body 51 with an intervening ported gasket 53.

The body 51 has a valve chamber 54 and a communicating diaphragm chamber 55, while the body 52 has a valve chamber 56 and a communicating diaphragm chamber 57. The brake pipe passage 48 communicates with all four of these chambers. Closing the outer side of chamber 55 is a diaphragm 58 clamped at its periphery by cap 59. The chamber 61 within the cap at the left of diaphragm 58 is connected with quick service chamber 44 by passage 47. Closing the outer side of chamber 57 is a diaphragm 62 clamped at its periphery by cap 63. The chamber 64 within cap 63 at the left of diaphragm 62 is connected with delay reservoir 43 by passage 46.

Each of the diaphragms actuates a longitudinally reciprocable stem guided at its ends in the bodies and caps and having opposed convex disks between which the respective diaphragms are clamped at their centers, as shown clearly in the drawings. These disks serve as thrust members and also as limit stops to control the range of motion of the stems. The peripheral portions of the disks perform the stop function and are notched to prevent their sealing against air flow. The stem actuated by diaphragm 58 is indicated by the numeral 65 and that actuated by diaphragm 62 by numeral 66. A coil compression spring 67 urges stem 65 inward, while a similar spring 68 performs a similar function as to stem 66.

The valve chamber 54 has a slide valve seat formed with two ports. One port, 69, leads to atmosphere and the other, 71, communicates with passage 46 and consequently with delay reservoir 43. A slide valve 72 is closely confined in a notch in stem 65. In its outer position (Fig. 1) it isolates ports 69 and 71. In its inner position (Fig. 2) a cavity 73 with slender extension 74 offers restricted communication between the ports 69 and 71. Brake pipe pressure acts on the top of the valve 72 and holds it seated.

The valve chamber 56 has a slide valve seat formed with a port 75 in communication with passage 47 and consequently with quick service chamber 44. In this seat is also an exhaust port 76 which communicates with atmosphere through a restricted flow fitting 77. A slide valve 78 closely confined in a notch in stem 66 controls these ports by means of a cavity 79. In the inward position (Fig. 1) of the valve 78, cavity 79 partly overlaps port 76 and offers a restricted connection between ports 75 and 76, while in the outward position of valve 78 (Fig. 3) cavity 79 freely connects ports 75 and 76. The valve 78 is held to its seat by brake pipe pressure in chamber 56.

The exhaust fitting 77 is of such size as to give substantially the same rate of discharge from the equalizing valve as is given by the fitting normally used at 13 (the present standard fitting is ¼" bore). The capacity of quick service chamber 44 is such as to ensure a rapid but limited initial drop in brake pipe pressure sufficient to move adjacent triple valves to quick service position. A volume of 100 cu. in. will commonly suffice.

In full flow position cavity 79 has a flow capacity exceeding that of fitting 77, while in restricting position the flow capacity is materially less than that of fitting 77.

The volume of reservoir 43 may be chosen at will, but this volume and the capacity of port 74 must be so coordinated that when 74 is open pressure in delay reservoir 43 will fall faster than brake pipe pressure.

OPERATION

*Running position*

The engineer's brake valve charges the brake pipe through the feed valve, as usual, and at the same time the equalizing reservoir is charged. The equalizing discharge valve remains closed.

Air at brake pipe pressure flows through ports 32 and 34 and pipe 19 charging delay reservoir 43 to brake pipe pressure. Chamber 44 if not already completely vented to atmosphere becomes so by way of passage 47, port 75, cavity 79, port 76 and fitting 77. Consequently brake pipe pressure in chamber 55 forces diaphragm 58 to the left overpowering spring 67 and shifting valve 72 to the position of Fig. 1 in which it prevents venting flow from reservoir 43.

As reservoir 43 is charged and its pressure approaches brake pipe pressure, spring 68 will assist in shifting diaphragm 62, stem 66 and valve 78 to the vent restricting position of Fig. 1.

*Service application with minimum pressure gradient in brake pipe*

Under such conditions brake cylinder pressures throughout the train will rise uniformly and rather slowly in service. Consequently the reduction of brake pipe pressure need be slowed only sufficiently to allow the slack to adjust itself.

When the engineer moves his brake valve to service position, until the desired reduction is made in the equalizing reservoir, and then to lap, all feeding flow and all flow through pipe 19 is stopped. Since brake pipe pressure is substantially uniform, little or no surging flow takes place in the brake pipe, but equalizing piston 22 lifts promptly. The first flow from the brake pipe to quick service chamber 44 is rapid, but slows when equalization with chamber 44 occurs. The resulting sudden but limited reduction of brake pipe pressure ensures movement of adjacent triple valves to service position.

Quick service chamber 44 at once starts venting slowly to atmosphere by way of passage 47 and fitting 77, the valve 78 being in flow-restricting position.

The charging of quick service chamber 44 to brake pipe pressure equalizes the pressures on diaphragm 58, so that spring 67 moves valve 72 inward and starts a venting flow from delay reservoir 43 which will reduce pressure in reservoir 43 slightly faster than brake pipe pressure can be reduced through fitting 77. Gradually pressure to the left of diaphragm 62 falls below brake pipe pressure to the right of that diaphragm. When spring 68 is overpowered valve 78 is shifted to non-restricting position, and chamber 44 which is still receiving air from the equalizing discharge valve is vented at the full capacity of fitting 77.

*Service application with heavy pressure gradient in brake pipe*

When the brake valve is manipulated to produce a service application, the heavy flow to the rear end and continued leakage cause a heavy pressure drop adjacent the brake valve. Consequently the equalizing piston 22 rises later or less sharply. Thus valve 72 moves less quickly to venting position, and when it does so move must vent reservoir 43 for a longer period before the pressure in this reservoir overtakes the falling brake pipe pressure. Hence valve 78 remains longer in its flow restricting position, and the venting flow through the equalizing discharge valve is limited and the duration of flow is protracted.

This tends to delay the full application of the brakes at the front end of the trains.

The device operates satisfactorily with conventional triple valves, but can be made to give peculiarly satisfactory results in conjunction with triple valves whose functioning is suitably modified by brake pipe gradient.

What is claimed is,—

1. The combination of a brake pipe; an engineer's brake valve; a timing reservoir; means for charging said timing reservoir under running conditions; a quick service chamber into which the engineer's brake valve vents the brake pipe to cause a service reduction of brake pipe pressure; means actuated at least in part by development of pressure in the quick service chamber to establish a bleeding flow from said timing reservoir; means affording a limited venting flow from said quick service chamber; and means responsive to depletion of pressure in said timing reservoir for increasing such venting flow.

2. The combination of a brake pipe; an engineer's brake valve; a timing reservoir; means for charging said timing reservoir under running conditions; a quick service chamber into which the engineer's brake valve vents the brake pipe to cause a service reduction of brake pipe pressure; means responsive to the pressure differential between brake pipe and quick service chamber to control a bleeding flow from said timing reservoir; means affording a limited venting oflw from said quick service chamber; and means responsive to a depletion of pressure in said timing reservoir for increasing such venting flow.

3. The combination of a brake pipe; an engineer's brake valve; a timing reservoir; means for charging said timing reservoir under running conditions; a quick service chamber into which the engineer's brake valve vents the brake pipe to cause a service reduction of brake pipe pressure; means actuated at least in part by development of pressure in the quick service chamber to establish a bleeding flow from said timing reservoir; means affording a limited venting flow from said quick service chamber; and means responsive to the pressure differential between timing reservoir and brake pipe for increasing the last-named venting flow.

4. The combination of a brake pipe; an engineer's brake valve; a timing reservoir; means for charging said timing reservoir under running conditions; a quick service chamber into which the engineer's brake valve vents the brake pipe to cause a service reduction of brake pipe pressure; means responsive to the pressure differential between brake pipe and quick service chamber to control a bleeding flow from said timing reservoir; means affording a limited venting flow from said quick service chamber; and means responsive to the pressure differential between timing reservoir and brake pipe for increasing the last-named venting flow.

5. The combination of a brake pipe; a timing reservoir; an engineer's brake valve including an equalizing discharge valve, said brake valve having a port open under running conditions to charge said timing reservoir; means responsive to the opening of the equalizing discharge valve for establishing bleeding flow from said resrvoir; and means responsive to the pressure differential between said reservoir and the brake pipe for controlling the rate of flow through said equalizing discharge valve.

6. The combination of a brake pipe; a timing reservoir; an engineer's brake valve including an equalizing discharge valve, said brake valve having a port open under running conditions to charge said timing reservoir; means responsive to the opening of the equalizing discharge valve for establishing bleeding flow from said reservoir at a rate which will reduce timing reservoir pressure faster than brake pipe pressure is reduced by maximum flow through the equalizing discharge valve; and means responsive to the pressure differential between said reservoir and the brake pipe for controlling the rate of flow through said equalizing discharge valve.

7. The combination of a brake pipe; a timing reservoir; an engineer's brake valve including an equalizing discharge valve, said brake valve having a port open under running conditions to charge said timing reservoir; means responsive to the opening of the equalizing discharge valve for establishing bleeding flow from said reservoir; valve means controlling the rate of flow through said equalizing discharge valve and having a restricted flow position and a normal flow position; and an abutment connected to shift said valve and subject to brake pipe pressure urging the valve toward normal flow position and to timing reservoir pressure urging the valve toward restricted flow position.

8. The combination of a brake pipe; a timing reservoir; an engineer's brake valve including an equalizing discharge valve, said brake valve having a port open under running conditions to charge said timing reservoir; means responsive to the opening of the equalizing discharge valve for establishing bleeding flow from said reservoir at a rate which will reduce timing reservoir pressure faster than brake pipe pressure is reduced by maximum flow through the equalizing discharge valve; valve means controlling the rate of flow through said equalizing discharge valve and having a restricted flow position and a normal flow position; and an abutment connected to shift said valve and subject to brake pipe pressure urging the valve toward normal flow position and to timing reservoir pressure urging the valve toward restricted flow position.

9. The combination of a brake pipe; a timing reservoir; an engineer's brake valve including an equalizing discharge valve, said brake valve having a port open under running conditions to charge said timing reservoir; means responsive to the opening of the equalizing discharge valve for establishing bleeding flow from said reservoir; valve means controlling the rate of flow through said equalizing discharge valve and having a restricted flow position and a normal flow position; an abutment connected to shift said valve and subject to brake pipe pressure urging the valve toward normal flow position and to timing reservoir pressure urging the valve toward restricted flow position; and yielding means assisting timing reservoir pressure in its action on said abutment.

10. The combination of a brake pipe; a timing reservoir; an engineer's brake valve including an equalizing dicharge valve, said brake valve having a port open under running conditions to charge said timing reservoir; a quick service chamber into which said equalizing discharge valve freely discharges when open; means for determining a maximum rate of venting flow from said quick service chamber; means rendered effective by the exsitence of a pressure in said quick service chamber to establish a bleeding flow from said timing reservoir; and means responsive to the pressure differential between said timing reservoir and brake pipe for limiting the venting flow from said quick service chamber to a rate less than said maximum.

11. The combination of a brake pipe; a timing reservoir; an engineer's brake valve including an equalizing discharge valve, said brake valve having a port open under running conditions to charge said timing reservoir; a quick service chamber into which said equalizing discharge valve freely discharges when open; means for determining a maximum rate of venting flow from said quick service chamber; means rendered effective by the existence of a pressure in said quick service chamber to establish a bleeding flow from said timing reservoir at a rate which reduces timing reservoir pressure faster than brake pipe pressure is reduced by flow through the equalizing discharge valve when limited to said maximum venting flow from said quick service chamber; and means responsive to the pressure differential between said timing reservoir and brake pipe for limiting the venting flow from said quick service chamber to a rate less than said maximum.

12. The combination of a brake pipe; a timing reservoir; an engineer's brake valve including an equalizing discharge valve, said brake valve having a port open under running conditions to charge said timing reservoir; a quick service chamber into which said equalizing discharge valve freely discharges when open; valve means controlling venting flow from said quick service chamber and having a position in which it establishes a maximum flow rate and a position in which it restricts said flow; means rendered effective by the existence of a pressure in said quick service chamber to establish a bleeding flow from said timing reservoir; and an abutment connected to shift the valve means which controls venting flow from said quick service chamber, said abutment being subject to brake pipe pressure urging the valve toward maximum flow position and to timing reservoir pressure urging the valve toward restricted flow position.

13. The combination of a brake pipe; a timing reservoir; an engineer's brake valve including an equalizing discharge valve, said brake valve having a port open under running conditions to charge said timing reservoir; a quick service chamber into which said equalizing discharge valve freely discharges when open; valve means controlling venting flow from said quick service chamber and having a position in which it establishes a maximum flow rate and a position in which it restricts said flow; means rendered effective by the existence of a pressure in said quick service chamber to establish a bleeding flow from said timing reservoir at a rate which will reduce timing reservoir pressure faster than brake pipe pressure is reduced by flow through the equalizing discharge valve when limited to the maximum flow rate from said quick service chamber; and an abutment connected to shift the valve means which controls venting flow from said quick service chamber, said abutment being subject to brake pipe pressure urging the valve toward maximum flow position, and to timing reservoir pressure urging the valve toward restricted flow position.

14. The combination of a brake pipe; a timing reservoir; an engineer's brake valve including an equalizing discharge valve, said brake valve having a port open under running conditions to charge said timing reservoir; a quick service chamber into which said equalizing discharge valve freely discharges when open; valve means controlling venting flow from said quick service chamber and having a position in which it establishes a maximum flow rate and a position in which it restricts said flow; means rendered effective by the existence of a pressure in said quick service chamber to establish a bleeding flow from said timing reservoir at a rate which will reduce timing reservoir pressure faster than brake pipe pressure is reduced by flow through the equalizing discharge valve when limited to the maximum flow rate from said quick service chamber; an abutment connected to shift the valve means which controls venting flow from said quick service chamber, said abutment being subject to brake pipe pressure urging the valve toward maximum flow position, and to timing reservoir pressure urging the valve toward restricted flow position; and yielding means assisting timing chamber pressure in its action on the last-named abutment.

15. The combination of a brake pipe; a timing reservoir; an engineer's brake valve including an equalizing discharge valve, said brake valve having a port open under running conditions to charge said timing reservoir; a quick service chamber into which said equalizing discharge valve freely discharges when open; a valve controlling venting flow from said quick service chamber and having a position in which it establishes a maximum flow and a position in which it restricts such flow; an abutment subject to the opposing pressures in the brake pipe and in said quick service chamber; a valve actuated by said abutment and having a closed position and a position in which it permits venting flow from said timing reservoir; and an abutment connected to control the valve which regulates venting flow from the quick service chamber, said abutment being subject to brake pipe pressure urging the valve toward normal flow position and to timing reservoir pressure urging the valve toward restricted flow position.

16. The combination of a brake pipe; a timing reservoir; an engineer's brake valve including an equalizing discharge valve, said brake valve having a port open under running conditions to charge said timing reservoir; a quick service chamber into which said equalizing discharge valve freely discharges when open; a valve controlling venting flow from said quick service chamber and having a position in which it establishes a maximum flow and a position in which it restricts such flow; an abutment subject to the opposing pressures in the brake pipe and in said quick service chamber; a valve actuated by said abutment and having a closed position and a position in which it permits venting flow from said timing reservoir at a rate which will reduce timing reservoir pressure faster than brake pipe pressure is reduced by flow through the equalizing discharge valve when limited to the maximum venting flow rate from said quick service chamber; and an abutment connected to control the valve which regulates venting flow from the quick service chamber, said abutment being subject to brake pipe pressure urging the valve toward normal flow position and to timing reservoir pressure urging the valve toward restricted flow position.

17. The combination of a brake pipe; a timing reservoir; an engineer's brake valve including an equalizing discharge valve, said brake valve having a port open under running conditions to charge said timing reservoir; a quick service chamber into which said equalizing discharge valve freely discharges when open; a valve controlling venting flow from said quick service chamber and having a position in which it establishes a maximum flow and a position in which it restricts such flow; an abutment subject to the opposing pressures in the brake pipe and in said quick service chamber; a valve actuated by said abutment and having a closed position and a position in which it permits venting flow from said timing reservoir at a rate which will reduce timing reservoir pressure faster than brake pipe pressure is reduced by flow through the equalizing discharge valve when limited to the maximum venting flow rate from said quick service chamber; an abutment connected to control the valve which regulates venting flow from the quick service chamber, said abutment being subject to brake pipe pressure urging the valve toward nomal flow position and to timing reservoir pressure urging the valve toward restricted flow position; and yielding means assisting timing reservoir pressure in its action on the last-named abutment.

18. The combination of a brake pipe; a timing reservoir; an engineer's brake valve including an equalizing discharge valve, said brake valve having a port open under running conditions to charge said timing reservoir; a quick service chamber into which said equalizing discharge valve freely discharges when open; a valve controlling venting flow from said quick service chamber and having a position in which it establishes a maximum flow and a position in which it restricts such flow; an abument subject to the opposing pressures in the brake pipe and in said quick service chamber; a valve actuated by said abutment and having a closed position and a position in which it permits venting flow from said timing reservoir at a rate which will reduce timing reservoir pressure faster than brake pipe pressure is reduced by flow through the equalizing discharge valve when limited to the maximum venting flow rate from said quick service chamber; an abutment connected to control the valve which regulates venting flow from the quick service chamber, said abutment being subject to brake pipe pressure urging the valve toward normal flow position and to timing reservoir pressure urging the valve toward restricted flow position; and yielding means acting on each of said abutments in opposition to brake pipe pressure.

19. The combination of an engineer's brake valve of the equalizing discharge type, said valve including the usual exhaust port leading from the equalizing discharge valve; a quick service chamber into which said port discharges, said chamber being provided with a restricted bleed port leading to atmosphere; and means controlled at least in part by brake pipe pressure for varying the capacity of said bleed port.

CHARLES A. CAMPBELL.